US009622159B2

(12) United States Patent
Buttolo et al.

(10) Patent No.: US 9,622,159 B2
(45) Date of Patent: Apr. 11, 2017

(54) PLUG-AND-PLAY INTERACTIVE VEHICLE INTERIOR COMPONENT ARCHITECTURE

(71) Applicant: Ford Global Technologies, LLC, Dearborn, MI (US)

(72) Inventors: Pietro Buttolo, Dearborn Heights, MI (US); James Stewart Rankin, II, Novi, MI (US); Stephen Ronald Tokish, Sylvania, OH (US); Stuart C. Salter, White Lake, MI (US); Gary Steven Strumolo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/842,051

(22) Filed: Sep. 1, 2015

(65) Prior Publication Data
US 2017/0064617 A1 Mar. 2, 2017

(51) Int. Cl.
*H04B 1/06* (2006.01)
*H04W 48/16* (2009.01)
(Continued)

(52) U.S. Cl.
CPC .......... *H04W 48/16* (2013.01); *B60R 16/037* (2013.01); *H04M 1/72583* (2013.01)

(58) Field of Classification Search
CPC ........ H04W 48/16; H04W 24/08; H04W 8/24
(Continued)

(56) References Cited

U.S. PATENT DOCUMENTS

| 4,721,954 A | 1/1988 | Mauch |
| 4,962,302 A | 10/1990 | Katsumi |

(Continued)

FOREIGN PATENT DOCUMENTS

| CN | 102445954 B | 3/2014 |
| CN | 103942963 A | 7/2014 |
| WO | 2013052043 A1 | 4/2013 |

OTHER PUBLICATIONS

Services/Bluetooth Development Portal, last accessed May 30, 2015, "Services". https://developer.bluetooth.org/gatt/services/Pages/Services-Home.aspx. (1 page).

(Continued)

*Primary Examiner* — Cong Tran
(74) *Attorney, Agent, or Firm* — Jennifer M. Stec; Brooks Kushman P.C.

(57) ABSTRACT

A system may include a wireless transceiver configured to scan for advertised services; and a processor programmed to receive a service identifier of a service from the wireless transceiver, verify a name included in the service identifier indicates that the service identifier is an in-vehicle component, and decode, from the service identifier, a relative location within the vehicle, a zone controlled by the in-vehicle component, and a category of functionality of the in-vehicle component. A method may include enumerating characteristics of a service of an in-vehicle component describing configurable functions of the in-vehicle component; retrieving a control state of the in-vehicle component using a read characteristic of the service; generating a user interface of the in-vehicle component indicating the configurable functions and the control state; and updating the control state of the in-vehicle component using a write characteristic of the service responsive to user input to the user interface.

18 Claims, 8 Drawing Sheets

(51) Int. Cl.
*H04M 1/725* (2006.01)
*B60R 16/037* (2006.01)

(58) Field of Classification Search
USPC .......... 455/434, 418–42, 435, 414.1, 569.2, 455/575.9, 95, 96, 99, 344, 345
See application file for complete search history.

(56) References Cited

U.S. PATENT DOCUMENTS

| | | | |
|---|---|---|---|
| 5,132,880 A | 7/1992 | Kawamura | |
| 5,143,437 A | 9/1992 | Matsuno et al. | |
| 5,543,591 A | 8/1996 | Gillespie et al. | |
| 5,648,656 A | 7/1997 | Begemann et al. | |
| 5,650,929 A | 7/1997 | Potter et al. | |
| 5,850,174 A | 12/1998 | DiCroce et al. | |
| 6,028,537 A * | 2/2000 | Suman .................. | B60K 35/00 340/426.14 |
| 6,377,860 B1 | 4/2002 | Gray et al. | |
| 6,397,249 B1 | 5/2002 | Cromer et al. | |
| 6,449,541 B1 | 9/2002 | Goldberg et al. | |
| 6,473,038 B2 | 10/2002 | Patwari et al. | |
| 6,536,928 B1 | 3/2003 | Hein et al. | |
| 6,935,763 B2 | 8/2005 | Mueller et al. | |
| 7,009,504 B1 | 3/2006 | Banter et al. | |
| 7,015,791 B2 | 3/2006 | Huntzicker | |
| 7,015,896 B2 | 3/2006 | Levy et al. | |
| 7,034,655 B2 | 4/2006 | Magner et al. | |
| 7,342,325 B2 | 3/2008 | Rhodes | |
| 7,502,620 B2 | 3/2009 | Morgan et al. | |
| 7,595,718 B2 | 9/2009 | Chen | |
| 7,672,757 B2 | 3/2010 | Hong et al. | |
| 7,778,651 B2 | 8/2010 | Billhartz | |
| 7,800,483 B2 | 9/2010 | Bucher | |
| 7,810,969 B2 | 10/2010 | Blackmore et al. | |
| 7,973,773 B2 | 7/2011 | Pryor | |
| 8,073,589 B2 | 12/2011 | Rasin et al. | |
| 8,324,910 B2 | 12/2012 | Lamborghini et al. | |
| 8,344,850 B2 | 1/2013 | Girard, III et al. | |
| 8,408,766 B2 | 4/2013 | Wilson et al. | |
| 8,421,589 B2 | 4/2013 | Sultan et al. | |
| 8,447,598 B2 | 5/2013 | Chutorash et al. | |
| 8,476,832 B2 | 7/2013 | Prodin et al. | |
| 8,482,430 B2 | 7/2013 | Szczerba | |
| 8,797,295 B2 | 8/2014 | Bernstein et al. | |
| 8,823,517 B2 | 9/2014 | Hadsall, Sr. | |
| 8,831,514 B2 | 9/2014 | Tysowski | |
| 8,856,543 B2 | 10/2014 | Geiger et al. | |
| 8,866,604 B2 | 10/2014 | Rankin et al. | |
| 8,873,147 B1 | 10/2014 | Rhodes et al. | |
| 8,873,841 B2 | 10/2014 | Yang et al. | |
| 8,930,045 B2 | 1/2015 | Oman et al. | |
| 8,947,202 B2 | 2/2015 | Tucker et al. | |
| 9,078,200 B2 | 7/2015 | Wuergler et al. | |
| 2002/0069002 A1 | 6/2002 | Morehouse | |
| 2002/0070923 A1 | 6/2002 | Levy et al. | |
| 2002/0087423 A1 | 7/2002 | Carbrey Palango et al. | |
| 2002/0096572 A1 | 7/2002 | Chene et al. | |
| 2002/0178385 A1 | 11/2002 | Dent et al. | |
| 2002/0197976 A1 | 12/2002 | Liu et al. | |
| 2003/0078709 A1 | 4/2003 | Yester et al. | |
| 2003/0171863 A1 | 9/2003 | Plumeier et al. | |
| 2004/0034455 A1 | 2/2004 | Simonds et al. | |
| 2004/0215532 A1 | 10/2004 | Boman et al. | |
| 2005/0040933 A1 | 2/2005 | Huntzicker | |
| 2005/0136845 A1 | 6/2005 | Masuoka et al. | |
| 2005/0185399 A1 | 8/2005 | Beermann et al. | |
| 2005/0261807 A1 | 11/2005 | Sorensen et al. | |
| 2005/0261815 A1 | 11/2005 | Cowelchuk et al. | |
| 2005/0288837 A1 | 12/2005 | Wiegand et al. | |
| 2006/0075934 A1 | 4/2006 | Ram | |
| 2006/0089755 A1 | 4/2006 | Ampunan et al. | |
| 2006/0155429 A1 | 7/2006 | Boone et al. | |
| 2006/0155547 A1 | 7/2006 | Browne et al. | |
| 2006/0250217 A1 | 11/2006 | Hamling et al. | |
| 2006/0258377 A1 | 11/2006 | Economos et al. | |
| 2006/0271261 A1 | 11/2006 | Flores et al. | |
| 2007/0021885 A1 | 1/2007 | Soehren | |
| 2007/0140187 A1 | 6/2007 | Rokusek et al. | |
| 2007/0198472 A1 | 8/2007 | Simonds et al. | |
| 2008/0140868 A1 | 6/2008 | Kalayjian et al. | |
| 2008/0180231 A1 | 7/2008 | Chen | |
| 2008/0288406 A1 | 11/2008 | Seguin et al. | |
| 2009/0253439 A1 | 10/2009 | Gantner et al. | |
| 2010/0176917 A1 | 7/2010 | Bacarella | |
| 2010/0216401 A1 | 8/2010 | Kitahara | |
| 2010/0222939 A1 | 9/2010 | Namburu et al. | |
| 2010/0225443 A1 | 9/2010 | Bayram et al. | |
| 2010/0233957 A1 | 9/2010 | Dobosz | |
| 2010/0280711 A1 | 11/2010 | Chen et al. | |
| 2010/0315373 A1 | 12/2010 | Steinhauser et al. | |
| 2011/0137520 A1 | 6/2011 | Rector et al. | |
| 2011/0187496 A1 | 8/2011 | Denison et al. | |
| 2011/0199298 A1 | 8/2011 | Bassompiere et al. | |
| 2011/0219080 A1 | 9/2011 | McWithey et al. | |
| 2012/0006611 A1 | 1/2012 | Wallace et al. | |
| 2012/0096908 A1 | 4/2012 | Fuse | |
| 2012/0109451 A1 | 5/2012 | Tan | |
| 2012/0136802 A1 | 5/2012 | McQuade et al. | |
| 2012/0214463 A1 | 8/2012 | Smith et al. | |
| 2012/0214471 A1 * | 8/2012 | Tadayon .................. | H04M 3/53 455/418 |
| 2012/0229253 A1 | 9/2012 | Kolar | |
| 2012/0244883 A1 | 9/2012 | Tibbitts et al. | |
| 2012/0254809 A1 | 10/2012 | Yang et al. | |
| 2012/0268235 A1 | 10/2012 | Farhan et al. | |
| 2012/0268242 A1 | 10/2012 | Tieman et al. | |
| 2013/0015951 A1 | 1/2013 | Kuramochi et al. | |
| 2013/0099892 A1 | 4/2013 | Tucker et al. | |
| 2013/0218371 A1 | 8/2013 | Simard et al. | |
| 2013/0259232 A1 | 10/2013 | Petel | |
| 2013/0329111 A1 | 12/2013 | Desai et al. | |
| 2013/0335222 A1 | 12/2013 | Comerford et al. | |
| 2014/0043152 A1 | 2/2014 | Lippman et al. | |
| 2014/0068713 A1 | 3/2014 | Nicholson et al. | |
| 2014/0139454 A1 | 5/2014 | Mistry et al. | |
| 2014/0142783 A1 | 5/2014 | Grimm et al. | |
| 2014/0164559 A1 | 6/2014 | Demeniuk | |
| 2014/0200736 A1 | 7/2014 | Silvester | |
| 2014/0212002 A1 | 7/2014 | Curcio et al. | |
| 2014/0213287 A1 | 7/2014 | MacDonald et al. | |
| 2014/0215120 A1 | 7/2014 | Saylor et al. | |
| 2014/0226303 A1 | 8/2014 | Pasdar | |
| 2014/0258727 A1 | 9/2014 | Schmit et al. | |
| 2014/0277935 A1 | 9/2014 | Daman et al. | |
| 2014/0309806 A1 | 10/2014 | Ricci | |
| 2014/0321321 A1 | 10/2014 | Knaappila | |
| 2014/0375477 A1 | 12/2014 | Jain et al. | |
| 2014/0379175 A1 | 12/2014 | Mittermeier | |
| 2014/0380442 A1 * | 12/2014 | Addepalli .............. | H04W 4/046 726/6 |
| 2015/0039877 A1 * | 2/2015 | Hall ........................ | G06F 1/32 713/2 |
| 2015/0048927 A1 | 2/2015 | Simmons | |
| 2015/0094088 A1 | 4/2015 | Chen | |
| 2015/0116085 A1 | 4/2015 | Juzswik | |
| 2015/0116100 A1 | 4/2015 | Yang et al. | |
| 2015/0147974 A1 | 5/2015 | Tucker et al. | |
| 2015/0148990 A1 | 5/2015 | Patel | |
| 2015/0149042 A1 | 5/2015 | Cooper et al. | |
| 2015/0154531 A1 | 6/2015 | Skaaksrud | |
| 2015/0172902 A1 | 6/2015 | Kasslin et al. | |
| 2015/0178034 A1 | 6/2015 | Penilla et al. | |
| 2015/0181014 A1 | 6/2015 | Gerhardt et al. | |
| 2015/0204965 A1 | 7/2015 | Magarida et al. | |
| 2015/0210287 A1 | 7/2015 | Penilla et al. | |
| 2015/0223151 A1 * | 8/2015 | Lei ........................ | H04W 76/048 455/434 |
| 2015/0278164 A1 | 10/2015 | Kim et al. | |
| 2015/0294518 A1 | 10/2015 | Peplin et al. | |
| 2015/0332530 A1 | 11/2015 | Kishita | |
| 2015/0352953 A1 | 12/2015 | Koravadi | |
| 2015/0382160 A1 | 12/2015 | Slay, Jr. et al. | |
| 2016/0039430 A1 * | 2/2016 | Ricci ...................... | H04W 48/04 701/36 |

(56) References Cited

U.S. PATENT DOCUMENTS

| 2016/0119782 | A1* | 4/2016 | Kim | H04W 12/02 |
|---|---|---|---|---|
| | | | | 455/415 |
| 2016/0133072 | A1 | 5/2016 | Santavicca | |
| 2016/0203661 | A1 | 7/2016 | Pudar et al. | |
| 2016/0248905 | A1 | 8/2016 | Miller et al. | |
| 2016/0332535 | A1* | 11/2016 | Bradley | B60N 2/002 |

OTHER PUBLICATIONS

Azad, Better Explained—Math insgihts that click., last accessed May 24, 2015, The Quick Guide to GUIDs, http://betterexplained.com/articles. (15 pages).

Bluetooth, Specification of the Bluetooth System, Dec. 2, 2014, "Master Table of Contents & Compliance Requirements," https://www.bluetooth.or/en-us/specification/adopted-specifications. (2772 pages).

Rasin, "An In-Vehicle Human-Machine Interface Module," XML Journal, Jan. 3, 2003, (9 pages), retrieved from http://kml.sys-con.com/node/40547 on Dec. 13, 2014.

Shahzada, "Touch Interaction for User Authentication," Thesis, Carleton University, Ottawa, Ontario, May 2014 (124 pages).

Napa Sae-Bae et al., "Biometric-Rich Gestures: A Novel Approach to Authentication on Multi-touch Devices," NYU-Poly, CHI 2012, May 5-10, 2012, Austin, TX (10 pages).

Hertz 24/7, "Book. Unlock. Go. You can reserve your vehicle anywhere, anytime—up to 10 days in advance," last accessed Jul. 28, 2015, https://www.hertz247.com/parkridge/en-us/About (3 pages).

Klosowski, "Unlock Your Car with a Bluetooth Powered Keyless Entry System," Lifehacker, Sep. 30, 2013, http://lifehacker.com/unlock-your-car-with-a-bluetooth-powered-keyless-entry-1427088798 (2 pages).

Toyota, Toyota Prius C Brochure, 2015, available at http://www.toyota.com/priusc/ebrochure.

Thomas, "2010 Toyota Prius Touch Tracer Display," Mar. 3, 2009, available at https://www.cars.com/articles/2009/3/2010-toyota-prius-touch-tracer-display/.

Gahran, "Vehicle owner's manuals—now on smartphones," CNN.com, Jan. 31, 2011, available at http://www.cnn.com/2011/TECH/mobile/01/31/car.manual.phone/.

* cited by examiner

PLUG-AND-PLAY INTERACTIVE VEHICLE INTERIOR COMPONENT ARCHITECTURE

TECHNICAL FIELD

Aspects of the disclosure generally relate to a plug-and-play architecture for interactive in-vehicle components.

BACKGROUND

Sales of personal devices, such as smartphones and wearables, continue to increase. Thus, more personal devices are brought by users into the automotive context. Smartphones can already be used in some vehicle models to access a wide range of vehicle information, to start the vehicle, and to open windows and doors. Some wearables are capable of providing real-time navigation information to the driver. Device manufacturers are implementing frameworks to enable a more seamless integration of their brand of personal devices into the driving experience.

BLUETOOTH technology may be included in various user devices to allow the devices to communicate with one another. BLUETOOTH low energy (BLE) is another wireless technology designed to provide for communication of data between devices. As compared to BLUETOOTH, BLE offers communication of smaller amounts of data with reduced power consumption.

BLE devices may perform the roles of central device or peripheral device. Central devices wirelessly scan for advertisements by peripheral devices, while peripheral devices make the advertisements. Once the peripheral device connects to the central device, the peripheral device may discontinue the advertisement, such that other central devices may no longer be able to wirelessly identify it or connect to it until the existing connection is terminated.

BLE devices transfer data using concepts referred to as services and characteristics. Services are collections of characteristics. A central device may connect to and access one or more of the characteristics of a service of a peripheral device. Characteristics encapsulate a single value or data type having one or more bytes of data as well as zero or more descriptors that describe the value of the characteristic. The descriptors may include information such as human-readable descriptions, a range for the value of the characteristic, or a unit of measure of the value of the characteristics. A Service Discovery Protocol (SDP) may allow a device to discover services offered by other devices and their associated parameters. The services may be identified by universally unique identifiers (UUIDs).

SUMMARY

In a first illustrative embodiment, a system includes a wireless transceiver configured to scan for advertised services; and a processor programmed to receive a service identifier of a service from the wireless transceiver, verify a name included in the service identifier indicates that the service identifier is an in-vehicle component, and decode, from the service identifier, a relative location within a vehicle, a zone controlled by the in-vehicle component, and a category of functionality of the in-vehicle component.

In a second illustrative embodiment, a computer-implemented method includes enumerating characteristics of a service of an in-vehicle component describing configurable functions of the in-vehicle component; retrieving a control state of the in-vehicle component using a read characteristic of the service; generating a user interface of the in-vehicle component indicating the configurable functions and the control state; and updating the control state of the in-vehicle component using a write characteristic of the service responsive to user input to the user interface.

In a third illustrative embodiment, a system includes a wireless transceiver; a user interface element; and a processor programmed to broadcast, using the wireless transceiver, a service identifier indicating presence of an in-vehicle component as well as functionality of the in-vehicle component; and update a counter value included in the service identifier responsive to identification of an update to a control state of the in-vehicle component determined according to user input to the user interface element.

DETAILED DESCRIPTION

Figure 1A:
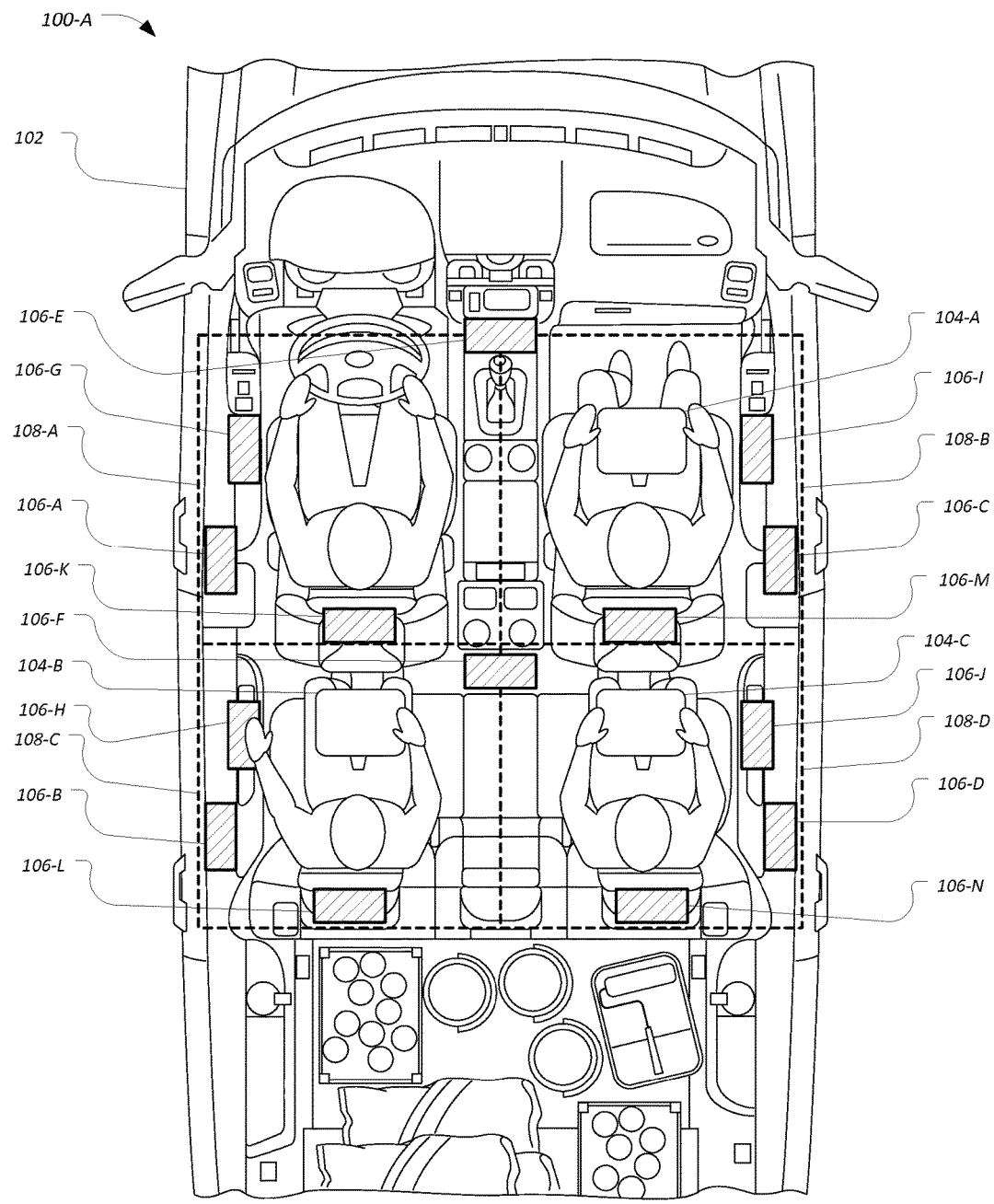
FIG. 1A illustrates an example system including a vehicle having a mesh of in-vehicle components configured to interact with vehicle occupants and user devices.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As smartphones, tablets, and other personal devices become more powerful and interconnected, there is an opportunity to integrate more intelligence and sensing into components of the vehicle interior. Traditional vehicle interior modules, such as reading lights or speakers, may be enhanced with a communication interface (such as Bluetooth Low Energy (BLE)). These enhanced modules of the vehicle interior may be referred to as in-vehicle components. The vehicle occupants may utilize their personal devices to control features of the in-vehicle components by connecting their personal devices to the in-vehicle components over the communications interface. In an example, a vehicle occupant may utilize an application installed to the personal device to turn the reading light on or off, or to adjust a volume of the speaker.

In many cases, it may be desirable for a vehicle occupant to be able to control the in-vehicle components that relate to the seat in which the vehicle occupant is located. In an example, the vehicle interior may be subdivided into zones, where each zone relates to a seating position of the vehicle. Each of the in-vehicle components may be assigned to the zone or zones in which the respective in-vehicle components are located and/or control. When one of the in-vehicle components receives an indication of a user interaction with its controls, that in-vehicle component may accordingly send a notification to the application installed to the personal device located within the vehicle associated with the same zone as that in-vehicle component. However, the number, type, and location of in-vehicle components may vary from vehicle to vehicle. Moreover, the functionality and capabilities of the included in-vehicle components may also vary.

To improve discovery and identification of in-vehicle components within the vehicle, the in-vehicle components may embed information descriptive of the location and functionality of the in-vehicle components into the primary service UUID that is included in advertisements provided by the in-vehicle components. In an example, a service UUID of an in-vehicle component lighting module may include information such as one or more of: a zone in which the light is located, a name of the light, and whether a physical interaction has taken place by the in-vehicle module having received user input. Each service may further advertise characteristics indicative of the features that are available for configuration by the in-vehicle mode, as well as characteristics that may be used to control the features. Accordingly, by using information advertised by the in-vehicle modules, the personal device of the user may be able to provide a user interface descriptive of the available in-vehicle modules and services, independent of the specific implementation of the in-vehicle component.

FIG. 1A illustrates an example system 100 including a vehicle 102 having a mesh of in-vehicle components 106 configured to interact with users and personal devices 104 of the users. The system 100 may be configured to allow the users, such as vehicle occupants, to seamlessly interact with the in-vehicle components 106 in the vehicle 102 or with any other framework-enabled vehicle 102. Moreover, the interaction may be performed without requiring the personal devices 104 to have been paired with or be in communication with a head unit or other centralized computing platform of the vehicle 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The personal devices 104-A, 104-B and 104-C (collectively 104) may include mobile devices of the users, and/or wearable devices of the users. The mobile devices may be any of various types of portable computing device, such as cellular phones, tablet computers, smart watches, laptop computers, portable music players, or other devices capable of networked communication with other mobile devices. The wearable devices may include, as some non-limiting examples, smartwatches, smart glasses, fitness bands, control rings, or other personal mobility or accessory device designed to be worn and to communicate with the user's mobile device.

The in-vehicle components 106-A through 106-N (collectively 106) may include various elements of the vehicle 102 having user-configurable settings. These in-vehicle components 106 may include, as some examples, overhead light in-vehicle components 106-A through 106-D, climate control in-vehicle components 106-E and 106-F, seat control in-vehicle components 106-G through 106-J, and speaker in-vehicle components 106-K through 106-N. Other examples of in-vehicle components 106 are possible as well, such as rear seat entertainment screens or automated window shades. In many cases, the in-vehicle component 106 may expose controls such as buttons, sliders, and touchscreens that may be used by the user to configure the particular settings of the in-vehicle component 106. As some possibilities, the controls of the in-vehicle component 106 may allow the user to set a lighting level of a light control, set a temperature of a climate control, set a volume and source of audio for a speaker, and set a position of a seat.

The vehicle 102 interior may be divided into multiple zones 108, where each zone 108 may be associated with a seating position within the vehicle 102 interior. For instance, the front row of the illustrated vehicle 102 may include a first zone 108-A associated with the driver seating position, and a second zone 108-B associated with a front passenger seating position. The second row of the illustrated vehicle 102 may include a third zone 108-C associated with a driver-side rear seating position and a fourth zone 108-D associated with a passenger-side rear seating position. Variations on the number and arrangement of zones 108 are possible. For instance, an alternate second row may include an additional fifth zone 108 of a second-row middle seating position (not shown). Four occupants are illustrated as being inside the example vehicle 102, three of whom are using personal devices 104. A driver occupant in the zone 108-A is not using a personal device 104. A front passenger occupant in the zone 108-B is using the personal device 104-A. A rear driver-side passenger occupant in the zone 108-C is using the personal device 104-B. A rear passenger-side passenger occupant in the zone 108-D is using the personal device 104-C.

Each of the various in-vehicle components 106 present in the vehicle 102 interior may be associated with the one or more of the zones 108. As some examples, the in-vehicle components 106 may be associated with the zone 108 in which the respective in-vehicle component 106 is located and/or the one (or more) of the zones 108 that is controlled by the respective in-vehicle component 106. For instance, the light in-vehicle component 106-C accessible by the front passenger may be associated with the second zone 108-B, while the light in-vehicle component 106-D accessible by passenger-side rear may be associated with the fourth zone 108-D. It should be noted that the illustrated portion of the vehicle 102 in FIG. 1A is merely an example, and more, fewer, and/or differently located in-vehicle components 106 and zones 108 may be used.

Figure 1B:
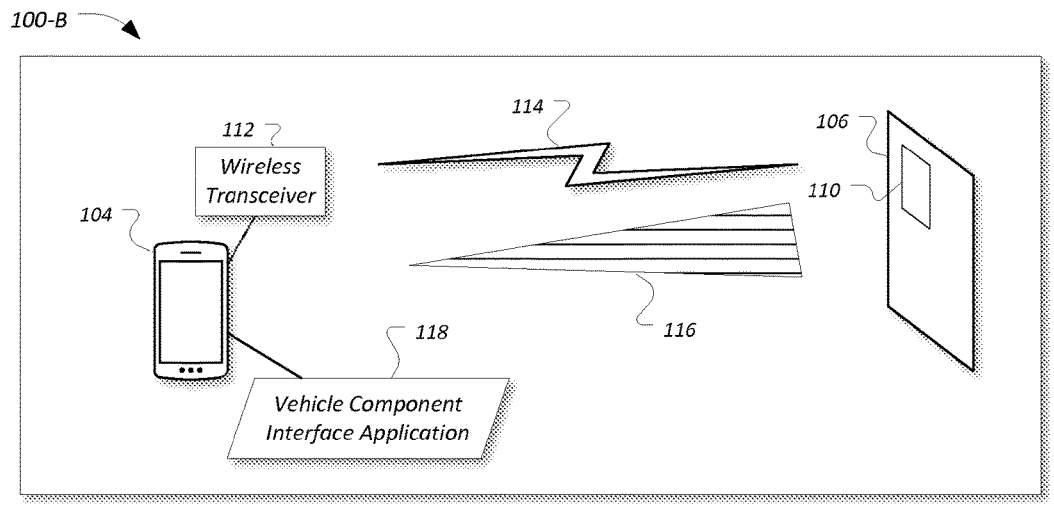
FIG. 1B illustrates an example in-vehicle component equipped with a wireless transceiver configured to facilitate detection of and identify proximity of the personal devices.

Referring to FIG. 1B, each in-vehicle component 106 may be equipped with a wireless transceiver 110 configured to facilitate detection of and identify proximity of the personal devices 104. In an example, the wireless transceiver 110 may include a wireless device, such as a Bluetooth Low Energy transceiver configured to enable low energy Bluetooth signal intensity as a locator, to determine the proximity of the personal devices 104. Detection of proximity of the personal device 104 by the wireless transceiver 110 may, in an example, cause a vehicle component interface application 118 of the detected personal device 104 to be activated.

In many examples the personal devices 104 may include a wireless transceiver 112 (e.g., a BLUETOOTH module, a ZIGBEE transceiver, a Wi-Fi transceiver, an IrDA transceiver, an RFID transceiver, etc.) configured to communicate with other compatible devices. In an example, the wireless transceiver 112 of the personal device 104 may communicate data with the wireless transceiver 110 of the in-vehicle component 106 over a wireless connection 114. In another example, a wireless transceiver 112 of a wearable personal device 104 may communicate data with a wireless transceiver 112 of a mobile personal device 104 over a wireless connection 114. The wireless connections 114 may be a Bluetooth Low Energy (BLE) connection, but other types of local wireless connection 114, such as Wi-Fi or Zigbee may be utilized as well.

The personal devices 104 may also include a device modem configured to facilitate communication of the personal devices 104 with other devices over a communications network. The communications network may provide communications services, such as packet-switched network services (e.g., Internet access, VoIP communication services), to devices connected to the communications network. An example of a communications network may include a cellular telephone network. To facilitate the communications over the communications network, personal devices 104 may be associated with unique device identifiers (e.g., mobile device numbers (MDNs), Internet protocol (IP) addresses, identifiers of the device modems, etc.) to identify the communications of the personal devices 104 over the communications network. These personal device 104 identifiers may also be utilized by the in-vehicle component 106 to identify the personal devices 104.

The vehicle component interface application 118 may be an application installed to the personal device 104. The vehicle component interface application 118 may be configured to facilitate vehicle occupant access to features of the in-vehicle components 106 exposed for networked configuration via the wireless transceiver 110. In some cases, the vehicle component interface application 118 may be configured to identify the available in-vehicle components 106, identify the available features and current settings of the identified in-vehicle components 106, and determine which of the available in-vehicle components 106 are within proximity to the vehicle occupant (e.g., in the same zone 108 as the location of the personal device 104). The vehicle component interface application 118 may be further configured to display a user interface descriptive of the available features, receive user input, and provide commands based on the user input to allow the user to control the features of the in-vehicle components 106. Thus, the system 100 may be configured to allow vehicle occupants to seamlessly interact with the in-vehicle components 106 in the vehicle 102, without requiring the personal devices 104 to have been paired with or be in communication with a head unit of the vehicle 102.

To determine the in-vehicle components 106 that are in the same zone as the personal device 104, the system 100 may use one or more device location-tracking techniques to identify the zone 108 in which the personal device 104 is located. Location-tracking techniques may be classified depending on whether the estimate is based on proximity, angulation or lateration. Proximity methods are "coarse-grained," and may provide information regarding whether a target is within a predefined range but they do not provide an exact location of the target. Angulation methods estimate a position of the target according to angles between the target and reference locations. Lateration provide an estimate of the target location, starting from available distances between target and references. The distance of the target from a reference can be obtained from a measurement of signal strength 116 over the wireless connection 114 between the wireless transceiver 110 of the in-vehicle component 106 and the wireless transceiver 112 of the personal device 104, or from a time measurement of either arrival (TOA) or difference of arrival (TDOA).

One of the advantages of lateration using signal strength 116 is that it can leverage the already-existing received signal strength indication (RSSI) signal strength 116 information available in many communication protocols. For example, iBeacon uses the RSSI signal strength 116 information available in the Bluetooth Low-Energy (BLE) protocol to infer the distance of a beacon from a personal device 104 (i.e. a target), so that specific events can be triggered as the personal device 104 approaches the beacon. Other implementations expand on the concept, leveraging multiple references to estimate the location of the target. When the distance from three reference beacons are known, the location can be estimated in full (trilateration) from the following equations:

$$d_1^2 = (x-x_1)^2 + (y-y_1)^2 + (z-z_1)^2$$

$$d_2^2 = (x-x_2)^2 + (y-y_2)^2 + (z-z_2)^2$$

$$d_3^2 = (x-x_3)^2 + (y-y_3)^2 + (z-z_3)^2 \qquad (1)$$

Figure 1C:
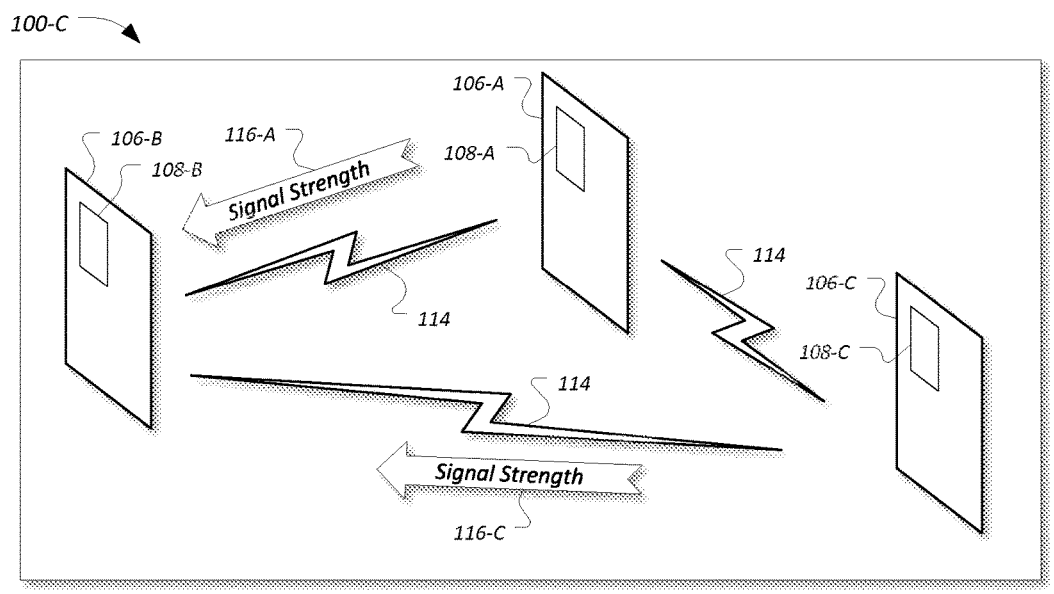
FIG. 1C illustrates an example in-vehicle component requesting signal strength from other in-vehicle components of the vehicle.

In an example, as shown in FIG. 1C, an in-vehicle component 106-B may broadcast or otherwise send a request for signal strength 116 to other in-vehicle components 106-A and 106-C of the vehicle 102. This request may cause the other in-vehicle components 106-A and 106-C to return wireless signal strength 116 data identified by their respective wireless transceiver 110 for whatever devices they detect (e.g., signal strength 116-A for the personal device 104 identified by the wireless transceiver 110-A, signal strength 116-C for the personal device 104 identified by the wireless transceiver 110-C). Using these signal strengths 116-A and 116-C, as well as signal strength 116-B determined by the in-vehicle component 106-B using its wireless transceiver 110-B, the in-vehicle component 106-B may use the equations (1) to perform trilateration and locate the personal device 104. As another possibility, the in-vehicle component 106 may identify the personal device 104 with the highest signal strength 116 at the in-vehicle component 106 as being the personal device 104 within the zone 108 as follows:

$$\text{Personal Device} = i \Rightarrow \max_{i=1,n} RSSI_i \qquad (5)$$

Thus, the mesh of in-vehicle components 106 and the personal devices 104 may accordingly be utilized to allow the in-vehicle components 106 to identify in which zone 108 each personal device 104 is located.

To enable tracking of personal devices 104 within the vehicle 102, information descriptive of the location (e.g., zone 108) of each in-vehicle component 106 relative to the vehicle 102 interior may be to be broadcast by the in-vehicle components 106 to the other in-vehicle components 106 and personal devices 104. Moreover, to provide status information indicative of the current settings of the in-vehicle components 106, the in-vehicle components 106 may also broadcast status information and/or information indicative of when changes to the settings of the in-vehicle components 106 are made.

As described in detail herein, BLE advertising packets in broadcasting mode may be used to communicate location, event, or other information from the in-vehicle components 106 to the personal devices 104. This may be advantageous, as the personal devices 104 may be unable to preemptively connect to each of the in-vehicle components 106 to receive status updates. In many BLE implementations, there is a maximum count of BLE connections that may be maintained, and the number of in-vehicle components 106 may exceed this amount. Moreover, many BLE implementations either do not allow for the advertisement of user data, or if such advertisement is provided, use different or incompatible data types to advertise it. However, as explained in detail herein, location and event information may be embedded into the primary service UUID that is included in the advertisement packet made by the in-vehicle component 106.

Figure 2:
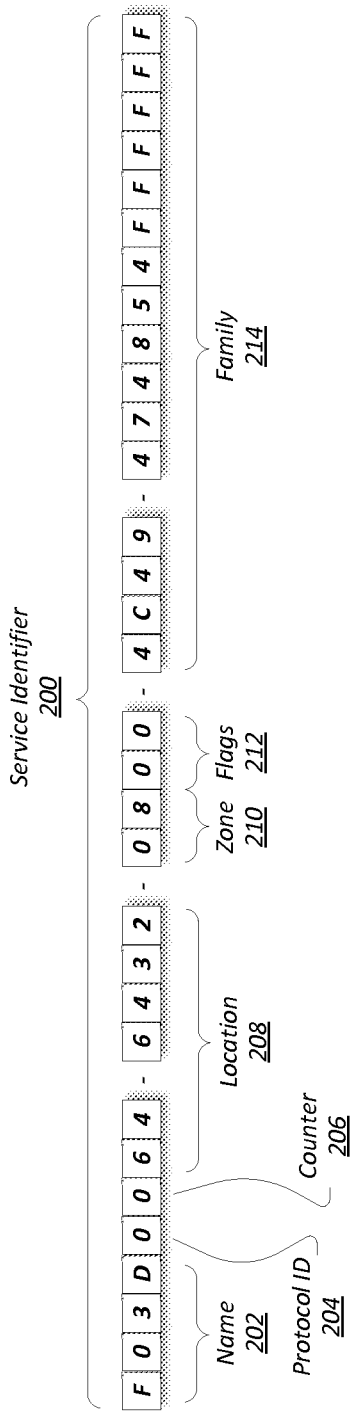
FIG. 2 illustrates an example service UUID advertised by an in-vehicle component.

FIG. 2 illustrates an example service identifier 200 advertised by an in-vehicle component 106. The example service identifier 200 is shown as being a 128-bit BLE UUID value, including a four-byte name 202, followed by a one-byte protocol identifier 204, followed by a one-byte counter 206, followed by a six-byte location 208, followed by a two-byte zone 210, followed by a two-byte flags 212, followed by a twelve-byte family 214 data element. It should be noted, however, that different lengths, types, orders, and values of service identifiers 200 and data elements of the service identifiers 200 may additionally or alternately be used.

The name 202 of the service identifier 200 may include a predefined value indicating that the service identifier 200 is an advertisement for an in-vehicle component 106. As shown, the name 202 includes the four-byte string "F03D" to identify an in-vehicle component 106. It should be noted however that different predefined strings are possible, as well as use of shorter or longer names 202.

The protocol identifier 204 may indicate a type of information protocol used by the in-vehicle component 106 to describe the functionality of the in-vehicle component 106. In an example, a first predefined value (e.g., zero) may indicate a template of the interface may be reconstructed by parsing the characteristic identifiers 500 included within the service definition of the in-vehicle component 106 (described in detail below). Other predefined values may be used to indicate other types of protocols for describing the functionality of the in-vehicle component 106. In another example, a second predefined value (e.g., one) may indicate that an extensible markup language (XML) template file describing the functionality of the in-vehicle component 106 may be exchanged with the in-vehicle component 106, and a third predefined value (e.g., two) may indicate that an JavaScript object notation (JSON) representation describing the functionality of the in-vehicle component 106 may be exchanged with the in-vehicle component 106.

The counter 206 may indicate a rolling value that is incremented each time a control of the user interface of the in-vehicle component 106 is adjusted in setting or activated by a user. In one non-limiting example, the counter 206 may begin at an initial value (e.g., zero), and may increment until it reaches a maximum value (e.g., fifteen for a one-byte counter), whereupon a next increment may roll the counter 206 back to zero. It should be noted that for some manufacturers of wireless transceiver 110, a change in service UUID 200 requires a reboot of the wireless transceiver 110. Regardless of whether the wireless transceiver 110 requires a reboot, this is transparent to the other devices observing and scanning for advertising packets.

The location 208 may include information descriptive of the location of the in-vehicle component 106 inside the vehicle 102. In an example, the location 208 may include side-to-side, front-to-back, and height information indicating relative placement of the in-vehicle component 106. As one example, side-to-side location may indicate a relative side-to-side placement of the in-vehicle component 106 normalized such that the distance from the driver side to the passenger side of vehicle 102 is defined to be one-hundred arbitrary location units; front-to-back location may be defined with location at the steering wheel being zero; and vertical height may be defined with the vehicle cabin floor defined to be zero. As illustrated, the example location 208 coordinates indicate a location of the in-vehicle component 106 as set towards the middle of the second row seat, to the right, e.g., near the arm-rest.

The zone 210 may include information indicative of the zone 108 of the vehicle 102 cabin in which the in-vehicle component 106 is located. The zone 210 may be used, in an example, to aid in location of the personal devices 104 in the vehicle 102, as well as for identification of which of the in-vehicle components 106 are associated with which seating positions of the vehicle 102.

The flags 212 may include information indicative of whether additional optional functionality is supported by the in-vehicle component 106. In an example, the flags 212 may indicate whether or not the in-vehicle component 106 may additionally be utilized to facilitate connection to classic Bluetooth and Wi-Fi devices.

The family 214 may include information descriptive of the function of the in-vehicle component 106. In an example, the family 214 may include a friendly name of the category or type of in-vehicle component 106, e.g., "LIGHT" as illustrated in FIG. 2. In other examples, the family 214 may include an identifier of the friendly name of the in-vehicle component 106, which may be then looked up in a table to retrieve the friendly name.

By parsing the service identifier 200 of the advertisement data of the in-vehicle component 106, personal devices 104 and other in-vehicle components 106 scanning for advertisements may be able to: (i) identify the existence in the vehicle 102 of the in-vehicle component 106 (e.g., a "LIGHT" in the illustrated example), (ii) determine its location and zone 108 within the vehicle 102, and (iii) detect whether a physical interaction has taken place between a user and the in-vehicle component 106 (e.g., when changes are identified to the counter 206).

When a personal device 104 detects a change in the advertised counter 206 of the in-vehicle component 106, the personal device 104 may determine that a physical interaction has taken place with the in-vehicle component 106. Responsive to the detection, the personal device 104 may determine which zone 108 of the vehicle 102 in which the personal device 104 is located. When the zone 108 of the personal device 104 matches the zone 108 of the in-vehicle component 106 having an updated counter 206, the personal device 104 may connect to the in-vehicle component 106 and/or request to connect to the in-vehicle component 106.

In some examples, the in-vehicle component 106 may be configured to operate as a BLE central in a non-connectable broadcasting role, and the personal device 104 may be configured as a peripheral and observer role. In such examples, the personal device 104 may advertise a request to connect, and the in-vehicle component 106 may be able to determine whether to allow the connection, as well as to be in charge of initiation of the connection. For instance, if the personal device 104 is detected by the in-vehicle component 106 as being located outside the vehicle 102 (e.g., according to signal strength 116 measurements received from the other the in-vehicle components 106) the connection may be refused. Or, a parent sitting in the passenger seat might decide to revoke all control from the personal devices 104 of children sitting in the back of the vehicle 102.

In other examples, the in-vehicle components 106 may operate in a peripheral role, while the personal devices 104 may act in a central role. In such an example, the personal devices 104 may control permission with respect to whether the personal devices 104 have permission to connect and control the in-vehicle components 106.

The vehicle component interface application 118 executed by the personal device 104 may be configured to scan for and update a data store of available in-vehicle components 106. As some examples, the scanning may be performed periodically, responsive to a user request to refresh, or upon activation of the vehicle component interface application 118. In examples where the scanning is performed automatically, the transition from vehicle 102 to vehicle 102 and from vehicle 102 to home or office may be seamless, as the correct set of functionality is continuously refreshed and the user interface of the vehicle component interface application 118 is updated to reflect the changes.

Figure 3:
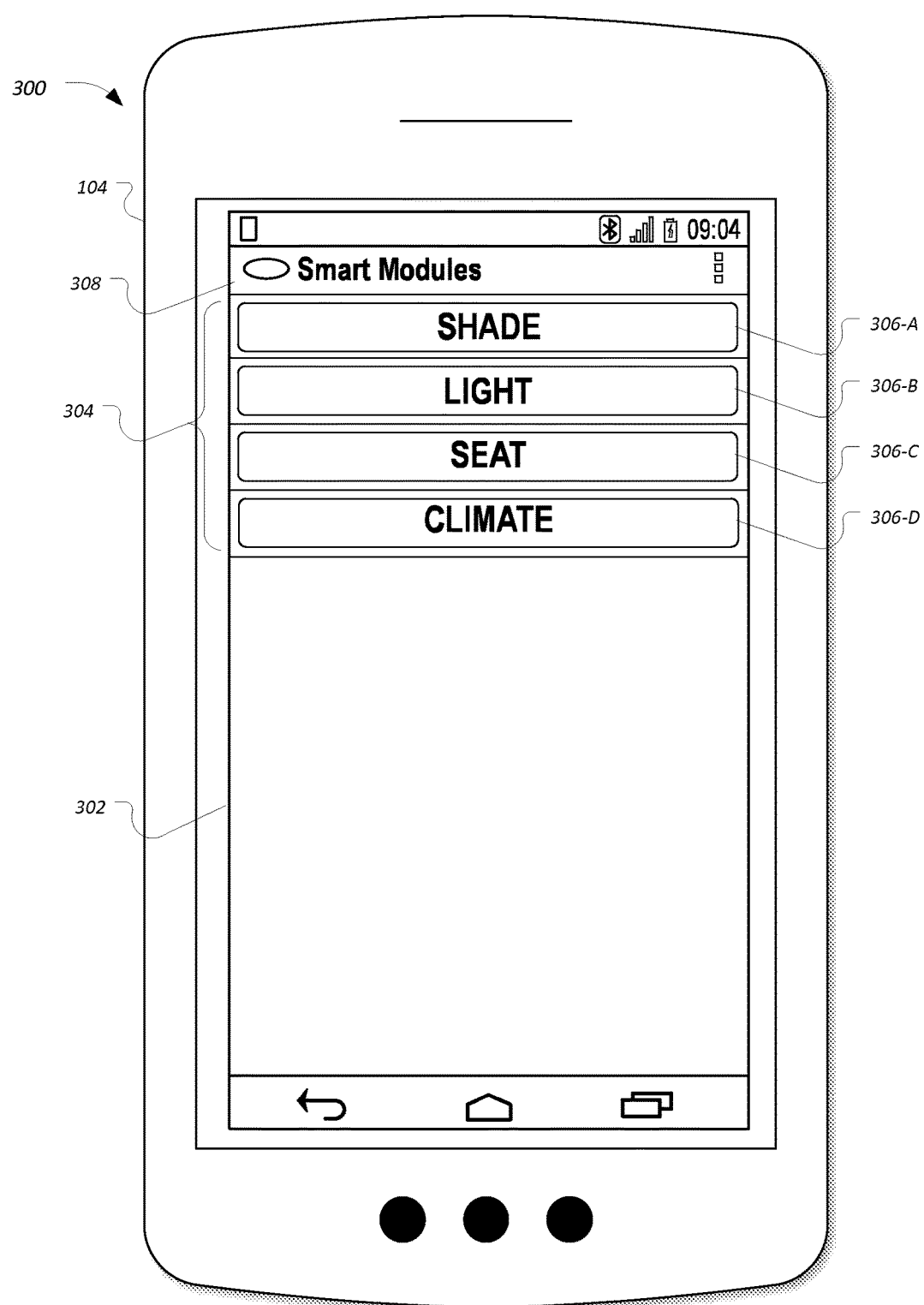
FIG. 3 illustrates an example user interface of the vehicle component interface application illustrating in-vehicle components detected by the personal device.

FIG. 3 illustrates an example user interface 300 of the vehicle component interface application 118 illustrating in-vehicle components 106 detected by the personal device 104. As shown, the user interface 300 may be presented by the vehicle component interface application 118 on a display 302 of the personal device 104, and may include a listing 304 configured to display selectable list entries 306-A through 306-D (collectively 306) indicative of the identified in-vehicle components 106. Each of the selectable list entries 306 may indicate a detected in-vehicle component 106 family 214 available for configuration by the user (e.g., within the zone 108 in which the personal device 104 of the user is located). The user interface 300 may also include a title label 308 to indicate to the user that the user interface 300 is displaying a menu of in-vehicle components 106 as detected by the vehicle component interface application 118.

As illustrated, the listing 304 of the vehicle component interface application 118 includes an entry 306-A for a shade in-vehicle component 106, an entry 306-B for a light in-vehicle component 106, an entry 306-C for a seat in-vehicle component 106, and an entry 306-D for a climate control in-vehicle component 106. The listing 304 may operate as a menu, such that a user of the user interface 300 may be able to scroll through list entries of the list control 304 (e.g., using up and down arrow buttons and a select button to invoke a selected menu item). In some cases, the list control 304 may be displayed on a touch screen such that the user may be able to touch the list control 304 to select and invoke a menu item. As another example, the user interface 300 may support voice command selection of the menu items. For example, to invoke the options of the light in-vehicle component 106, the user may speak the voice command "LIGHT." It should be noted that the illustrated entries 306 are merely examples, and more or different in-vehicle components 106 may be available.

Figure 4:
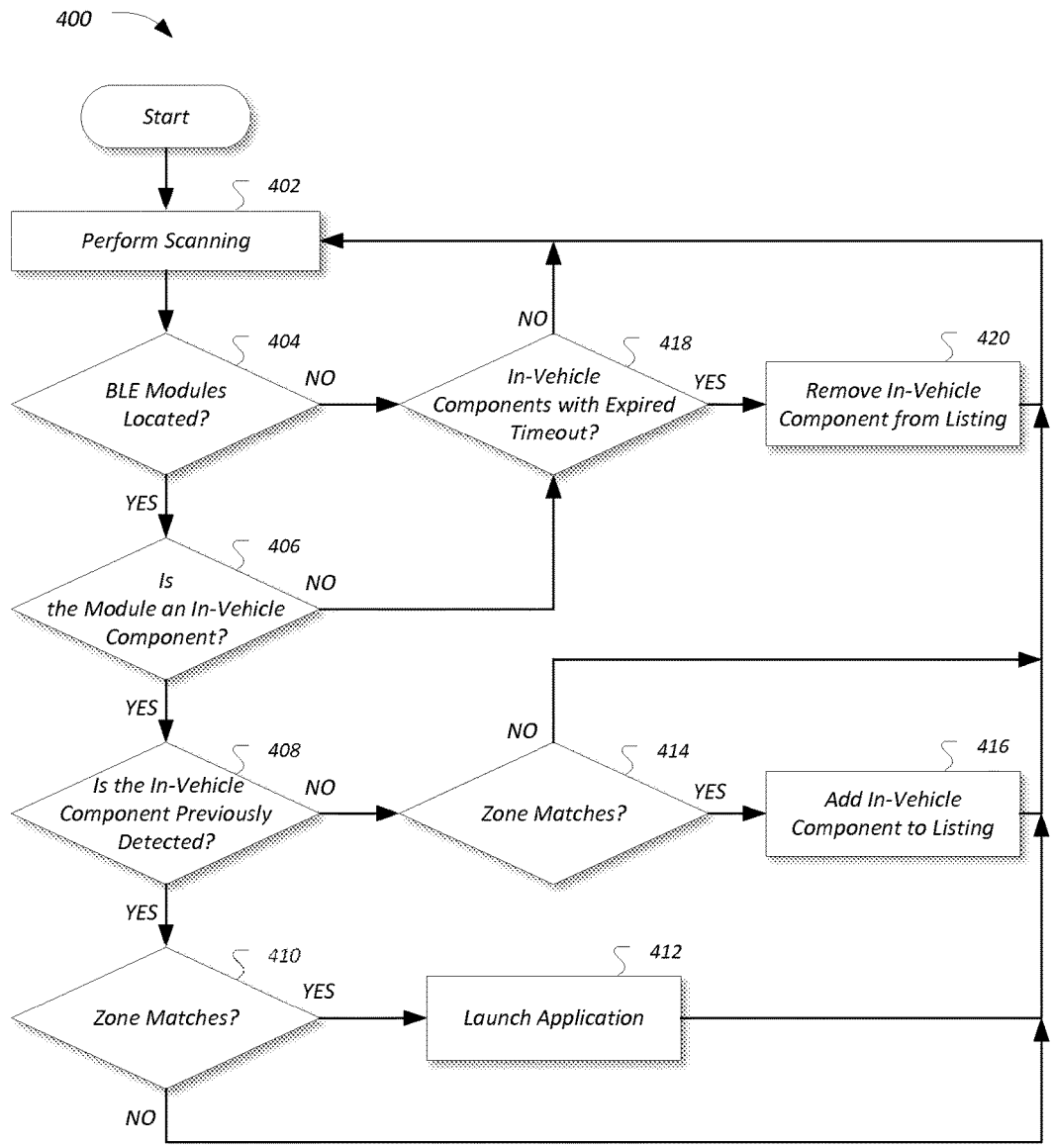
FIG. 4 illustrates an example process for scanning for in-vehicle components by the personal device.

FIG. 4 illustrates an example process 400 for scanning for in-vehicle components 106 by the personal device 104. In an example, the process 400 may be performed by the personal device 104 executing the vehicle component interface application 118 and in a vehicle 102 cabin.

At operation 402, the personal device 104 performs scanning. In an example, a scanning service of the vehicle component interface application 118 executed by the personal device 104 may utilize the wireless transceiver 112 to scan for BLE advertisements.

At operation 404, the personal device 104 determines whether any BLE modules are present. If so, control passes to operation 406. Otherwise control passes to operation 418.

At operation 406, the personal device 104 determines whether the detected BLE modules are in-vehicle components 106. In an example, when a module is found, the vehicle component interface application 118 parses the service UUID 200 of the in-vehicle component 106 to determine whether the service UUID 200 is indicative of an in-vehicle component 106. For instance, the vehicle component interface application 118 may identify whether the name 202 includes the predefined value indicating that the service identifier 200 in a BLE advertisement for an in-vehicle component 106. If the module is an in-vehicle component 106, control passes to operation 408. Otherwise, control passes to operation 418.

At operation 408, the personal device 104 determines whether the detected in-vehicle component 106 is previously detected. For instance, the personal device 104 may maintain data indicative of the currently active in-vehicle components 106, which, in an example, may be used to generate the listing 304 of the vehicle component interface application 118 of the user interface 300. The personal device 104 may compare elements of the service identifier 200 of the detected in-vehicle component 106 (e.g., location 208, zone 210, family 214, etc.) to the corresponding elements of the service identifiers 200 of the previously-detected in-vehicle components 106 to determine whether the in-vehicle component 106 was previously detected. If the in-vehicle component 106 was previously detected, then the advertisement by the in-vehicle component 106 indicates an advertisement based on a user interaction to the in-vehicle component 106. This user interaction may be, for example, a user pressing a control of the user interface of the in-vehicle component 106. If so, control passes to operation 410. Otherwise, control passes to operation 414.

At operation 410, the personal device 104 determines whether the zone 108 of the in-vehicle component 106 matches the zone 108 of the personal device 104. If so, control passes to operation 412 to cause the vehicle component interface application 118 of the personal device 104 to respond. This response may include, as some non-limiting examples, to invoke the user interface 300, to invoke another user interface related to the specific the in-vehicle component 106, and to provide a notification (e.g., based on settings of the personal device 104) to allow for the user to interact with the in-vehicle component 106 using the personal device 104. If the zone 108 is not a match, control returns to operation 402 to perform scanning.

At operation 414, the personal device 104 determines whether the zone 108 of the in-vehicle component 106 matches the zone 108 of the personal device 104. If so, control passes to operation 416 to cause the vehicle component interface application 118 of the personal device 104 to add the newly-detected in-vehicle component 106 to the currently active list. In an example, the vehicle component interface application 118 may add information from the advertisement to the list, such as the service identifier 200 of the in-vehicle component 106 and timeout information from the advertisement. If not, control returns to operation 402 to perform scanning.

At operation 418, the personal device 104 determines whether any of the in-vehicle components 106 have an expired timeout. In an example, the vehicle component interface application 118 may determine whether any timeouts of the BLE modules that are on the currently active list of the in-vehicle components 106 have expired. If so, control passes to operation 420 to remove those in-vehicle components 106 from the currently active list. If not, control returns to operation 402 to perform scanning.

It should be noted that the user interface corresponding to a specific in-vehicle component 106 may also be affirmatively launched from the user interface 300 of the vehicle component interface application 118. In an example, responsive to receiving user selection of the LIGHT functional category, the vehicle component interface application 118 may automatically select the in-vehicle component(s) 106 providing that functionality according to family 214 and seating zone 108.

When a user decides to control an in-vehicle component 106, e.g., by selecting an entry 306 of the listing 304 of the user interface 300, or because the in-vehicle component 106 was advertised that it was triggered by a physical interaction on the in-vehicle component 106, data describing the functions/interface and available controls of the in-vehicle component 106 may be provided to the personal device 104.

The protocol identifier 204 of the service identifier 200 of the in-vehicle component 106 may specify to the personal device 104 how to receive the interface information. In an example, the interface template information may be specified by the characteristic UUIDs 500 of the characteristics of the service of the in-vehicle component 106 identified by the service identifier 200. This approach utilizing the characteristics of the service of the in-vehicle component 106 may allow for the information to be quickly collected, as the amount of data exchange may be relatively minimal as compared to other protocols for retrieving interface definitions such as retrieval of an XML or JSON interface definition.

Figure 5:
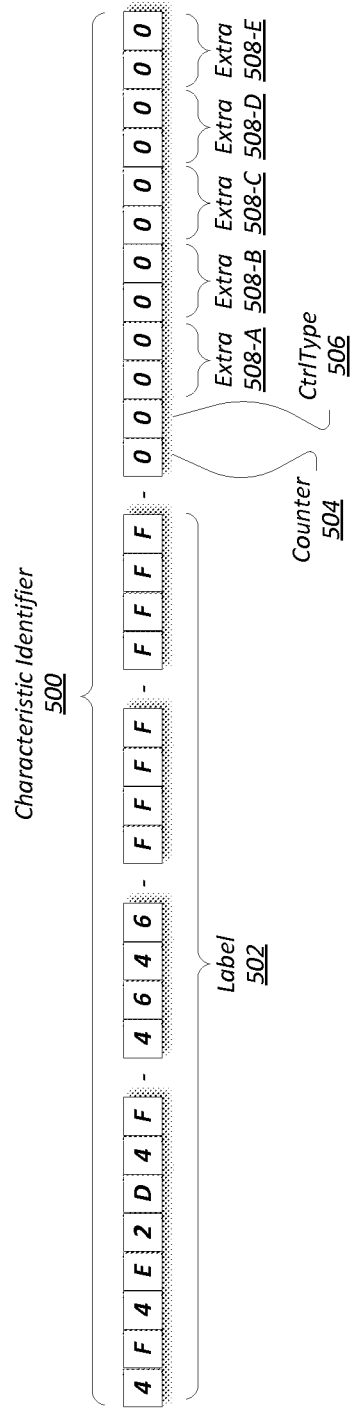
FIG. 5 illustrates an example characteristic UUID advertised by a service of an in-vehicle component.

FIG. 5 illustrates an example characteristic UUID 500 advertised by a service of an in-vehicle component 106. As shown, the example characteristic UUID 500 indicates an on-off toggle element of the light module interface of the LIGHT service identified in FIG. 2 and listed as entry 306-B in the user interface 300. The example characteristic UUID 500 is shown as being a 128-bit BLE UUID value, including a twenty-byte label 502, followed by a one-byte counter 504, followed by a one-byte control type identifier 506, followed by a set of extra 508 values (e.g., two-byte extra 508-A, followed by two-byte extra 508-B, followed by two-byte extra 508-C, followed by two-byte extra 508-D, followed by two-byte extra 508-E). It should be noted, however, that different lengths, types, orders, and values of characteristic UUIDs 500 and data elements of the characteristic UUIDs 500 may additionally or alternately be used.

The label 502 may include information descriptive of the function of the characteristic of the service of the in-vehicle component 106. In an example, the label 502 may include a friendly name of the characteristic, e.g., "ON-OFF" as illustrated in FIG. 5. In other examples, the label 502 may include an identifier of the friendly name of the in-vehicle component 106, which may be then looked up in a table to retrieve the friendly name.

The counter 504 may include a rolling value, similar to the counter 206 field described above, where the counter 504 is incremented each time the value of the function described by the characteristic is adjusted in setting. In one non-limiting example, the counter 504 may begin at an initial value (e.g., zero), and may increment until it reaches a maximum value (e.g., fifteen for a one-hex counter), whereupon a next increment may roll the counter 504 back to zero.

The control type identifier 506 may include a value descriptive of the type of function indicated by the characteristic. In an example, a first predefined control type identifier 506 value (e.g., zero) may indicate a binary or toggle value (e.g., for representation in a user interface as a toggle or on-off switch). Other predefined values of the control type identifier 506 may indicate other types of parameters, such as continuous parameters with a value along a range (e.g., volume, bass, treble, light intensity, backlight color, etc.) that may be displayed in a user interface as a slider or knob.

The extra 508 fields may include control type-specific or control-specific information. In an example, the extra 508 fields may include grouping, or other information that be used to improve the graphical layout of the user interface. In another example, the extra 508 fields may include information that may be useful for setting up other options relating to the specific functions or types of function of the characteristic.

Thus, by enumerating the characteristics of a service provided by an in-vehicle component 106, the personal device 104 may accordingly be able to retrieve data describing the functions/interface and available controls of the in-vehicle component 106. Moreover, additional functions or controls may be added for the in-vehicle component 106 by declaring additional characteristics of the service, e.g., in the in-vehicle component 106 BLE server.

In some examples, the characteristics describing the controls and functions may be used to read or write status information regarding the functions. However, in other examples, to simplify data exchange the characteristics describing controls may prevent reading or writing to the definitional characteristics. Rather, two additional characteristics may be used for the purpose of communicating status information. An EXCHANGEW characteristic may be used to write to the in-vehicle component 106 the new desired state for the controls, and an EXCHANGER characteristic may be used to acquire the current state of the controls from the in-vehicle component 106. In many examples, the EXCHANGEW characteristic and EXCHANGER characteristic may be named with predefined names that are in common with other in-vehicle components, to allow for easy identification of the EXCHANGEW characteristic and EXCHANGER characteristic by connected personal devices 104. The user of separate getter and setter characteristics may provide other advantages as well, such as the easy setting of values for multiple functions in the same message.

Figure 6:
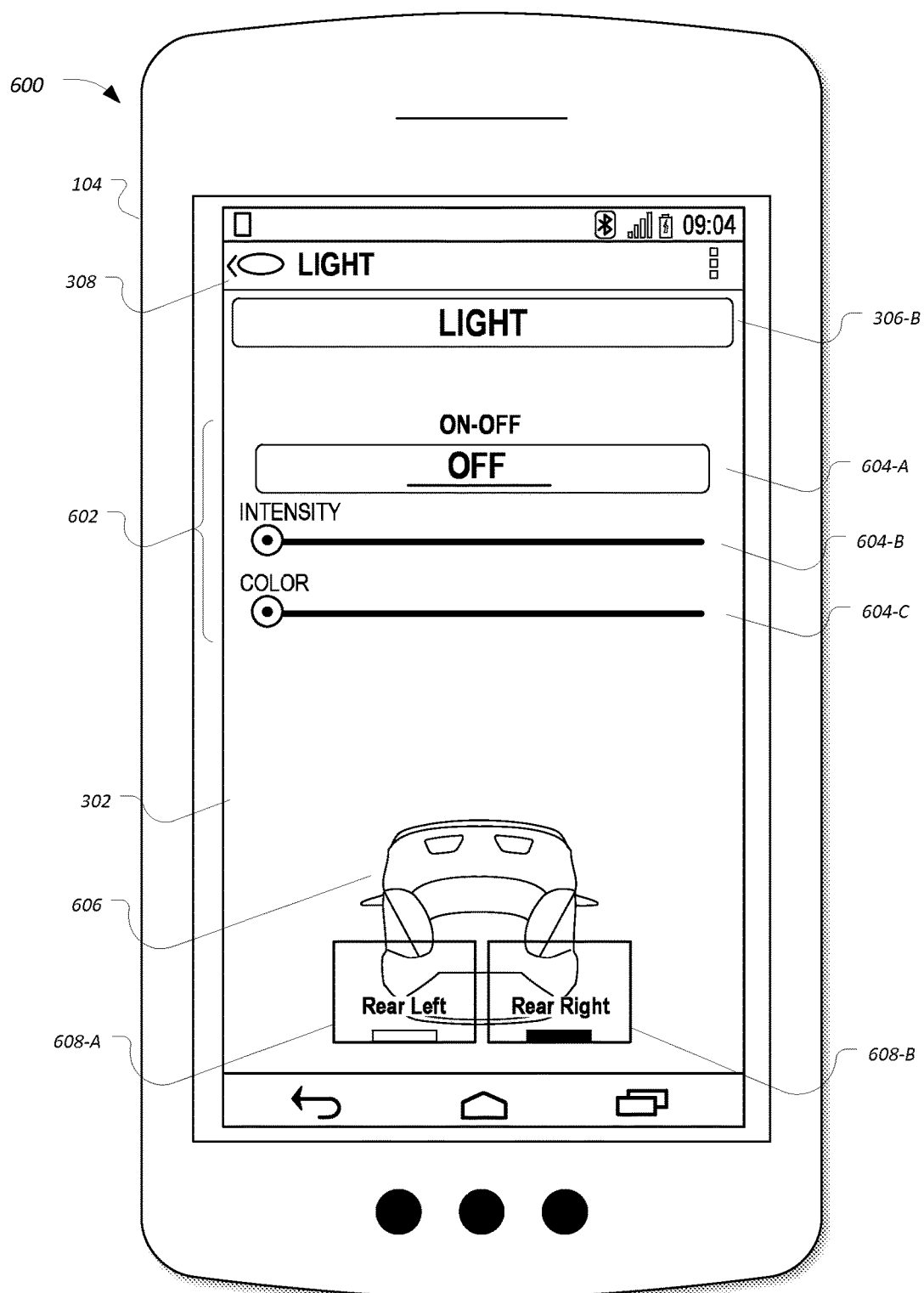
FIG. 6 illustrates an example user interface for control of a lighting in-vehicle component generated based on advertised characteristics of the in-vehicle component.

FIG. 6 illustrates an example user interface 600 for control of a lighting in-vehicle component 106. The user interface 600 may be generated by the vehicle component interface application 118 based on the information collected from the characteristics of the service of the in-vehicle component 106, and may be provided to the display 302 of the personal device 104. In an example, the user interface 600 may be automatically displayed to the personal device 104 as discussed above with respect to operation 412. In another example, the user interface 600 may be displayed responsive to user input to the entry 306-B in the user interface 300.

As shown, the user interface 600 may include a listing 602 configured to display selectable controls 604-A through 604-C (collectively 604) based on the identified in-vehicle components 106 features. Each of the selectable controls 604 may indicate a function of the indicated in-vehicle component 106 that is available for configuration by the user. The user interface 600 may also include a title label 308 to indicate to the user that the user interface 600 is displaying a menu of functions of the indicated in-vehicle component 106. In some cases, when the title label 308 is selected the user interface 600 may revert back to the user interface 300 allowing the user to return to the listing of currently active in-vehicle components 106.

As illustrated, the listing 602 includes a control 604-A for toggling on and off the light of the in-vehicle component 106 (e.g., generated based on the characteristic identifier 500 discussed above), a control 604-B for specifying an intensity of the light in-vehicle component 106 (e.g., generated based on a second characteristic identifier 500 of the in-vehicle component 106), and a control 604-C for specifying a color of the light of the in-vehicle component 106 (e.g., generated based on a third characteristic identifier 500). The listing 602 may also provide for scrolling in cases where there are more controls 604 that may be visually represented in the display 302 at one time. In some cases, the control 604 may be displayed on a touch screen such that the user may be able to touch the controls 604 to make adjustments to the functions of the in-vehicle component 106. As another example, the user interface 600 may support voice commands. For example, to toggle the light on, the user may speak the voice command "LIGHT ON," or simply "ON." It should be noted that the illustrated controls 604 are merely examples, and more or different functions or layouts of functions of the in-vehicle component 106 may be utilized.

It should be noted that while the controls 604 of the user interface 600 include a toggle switch used to turn the light on and off, and two sliders used to adjust intensity and ambient color based on the characteristics, the actual physical in-vehicle component 106 may have a different user interface 600. For instance, the in-vehicle component 106 may include a simpler user interface, such as a single mechanical or proximity switch to turn the light on and off, so the occupant would not have to depend on possession of a personal device 104 to utilize basic functionality of the in-vehicle component 106. However, as described with respect to the process 400, as that physical button is pressed, the counter 206 of the service UUID 200 advertisement may be updated, which may be detected by the personal device 104, thereby causing the user interface 600 to be displayed to offer a richer user interface experience than may be provided by the physical in-vehicle component 106.

In some examples, the user interface 600 may further include a zone interface 606 to select additional in-vehicle components 106 that are available inside the vehicle 102 within different zones 108. As one possibility, the zone interface 606 may include a control 608-A for selection of a driver-side rear zone 108-C, and a control 608-B for selection of a passenger-side rear zone 108-D (collectively controls 608). Responsive to selection of one of the controls 608, the user interface 600 may accordingly display the controls 604 of corresponding in-vehicle component 106 for the selected zone 108. For instance, if the light controls in the zone 108-C is currently being displayed and the user selects the control 608-B to display the corresponding control for the zone 108-D, the user interface 600 may display the functions of the light control for the zone 108-D.

Figure 7:
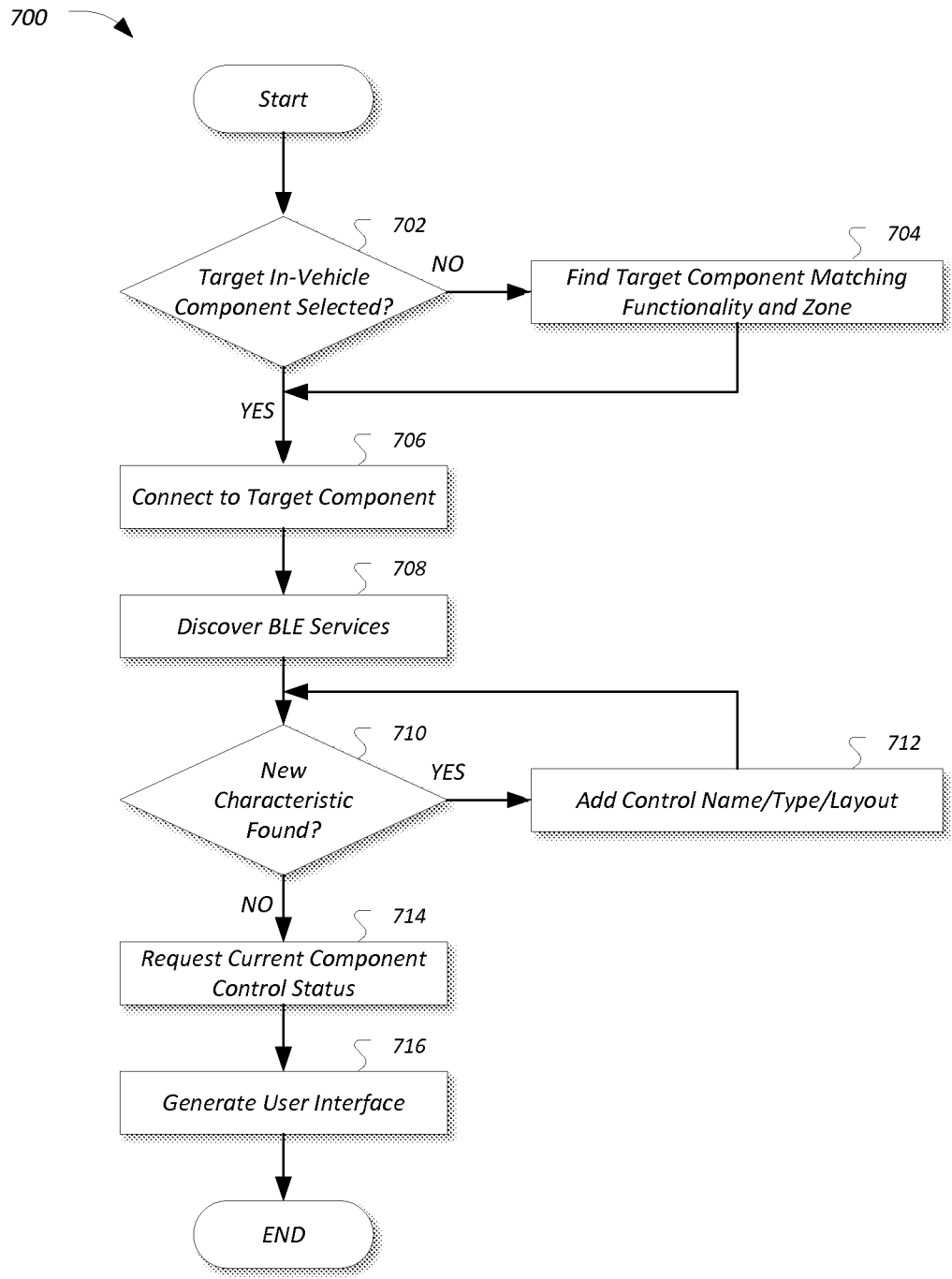
FIG. 7 illustrates an example process for generation of a user interface based on information collected from the characteristics of the in-vehicle component.

FIG. 7 illustrates an example process 700 for generation of a user interface 600 based on information collected from the characteristics of the in-vehicle component 106. In an example, the process 700 may be performed by the vehicle component interface application 118 of the personal device 104.

At operation 702, the personal device 104 determines whether a target in-vehicle component 106 is selected. In an example, an advertisement by the in-vehicle component 106 may indicate an updated counter 206 indicating advertisement based on a user interaction to the in-vehicle component 106. The vehicle component interface application 118 may identify the advertisement according to information received from the wireless transceiver 112 of the personal device 104. If so, control passes to operation 706. In another example, a user selects an entry 306 from the user interface 300. If so, control passes to operation 704.

At operation 704, the personal device 104 finds a target in-vehicle component 106 according to functionality and zone 108. In an example, the vehicle component interface application 118 may access the listing of currently active in-vehicle components 106 to identify the in-vehicle component 106 having a service identifier 200 corresponding to the zone 108 of the personal device 104 (e.g., by comparing the zone 108 to the zone 210) and to the functionality of the selected entry 306 (e.g., by comparing to the family 214).

At operation 706, the personal device 104 connects to the target in-vehicle component 106. In an example, the vehicle component interface application 118 may form a wireless connection 114 to the in-vehicle component 106 advertising the updated counter 206 identified at operation 702. In another example, the personal device 104 may form a wireless connection 114 to the in-vehicle component 106 identified at operation 704.

At operation 708, the personal device 104 discovers services of the in-vehicle component 106. In an example, the vehicle component interface application 118 may determine, based on the value of the protocol identifier 204 of the service identifier 200 of the target in-vehicle component 106, that a template of the interface may be reconstructed by parsing the characteristic identifiers 500 included within the service definition of the in-vehicle component 106. If so, the vehicle component interface application 118 may enumerate the characteristics of the service provided by the in-vehicle component 106.

At operation 710, the personal device 104 determines whether a new characteristic is found. In an example, the vehicle component interface application 118 may maintain a listing of the characteristics of the in-vehicle component 106. If the characteristic UUIDs 500 advertised by the service of an in-vehicle component 106 are not included in the listing, control passes to operation 712. Otherwise control passes to operation 714.

At operation 712, the personal device 104 adds the new characteristic to the features of the in-vehicle component 106. In an example, the vehicle component interface application 118 may add the new characteristics to the listing of characteristics of the service of the in-vehicle component 106.

At operation 714, the personal device 104 requests the current status of the in-vehicle component 106 controls. In an example, the vehicle component interface application 118 may acquire the current state of the controls from the in-vehicle component 106 using the EXCHANGER characteristic of the service.

At operation 716, the personal device 104 generates the user interface 600. The generated user interface 600 may include a listing 602 of controls 604 based on the interface definition list created from the enumerated characteristics. The user interface 600 may further indicate the current state of the controls (e.g., on, off, volume level, etc.) based on the state of the controls received at operation 704. After operation 716, the process 700 ends.

Figure 8:
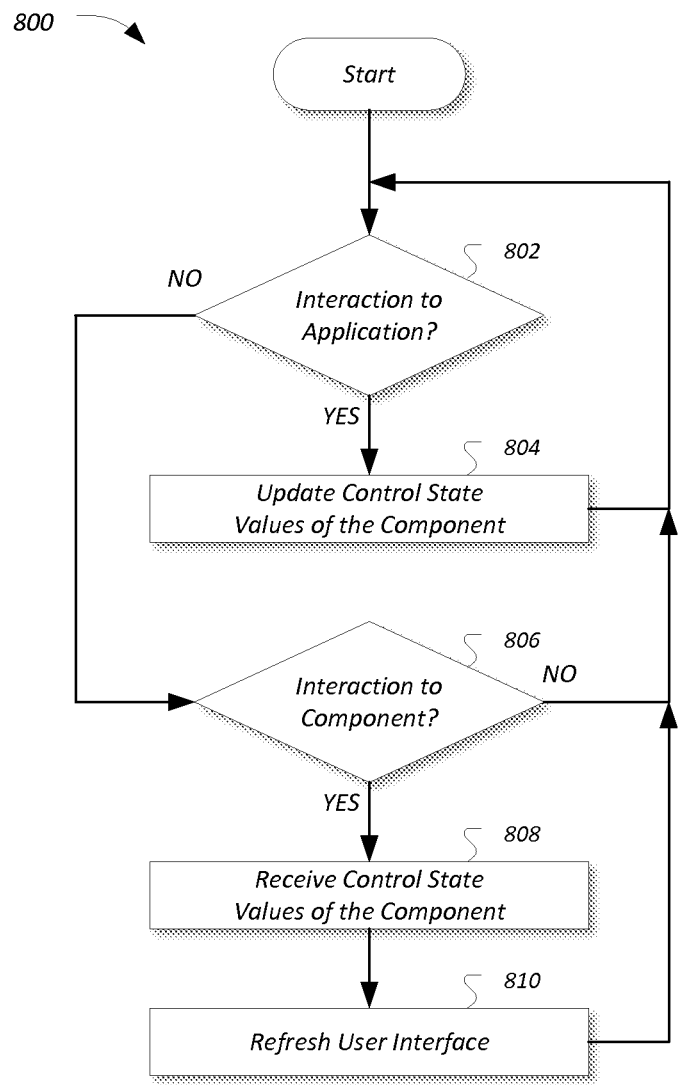
FIG. 8 illustrates an example process for updating the user interface based on user input to the in-vehicle component or to the personal device.

FIG. 8 illustrates an example process 800 for updating the user interface 600 based on user input to the in-vehicle component 106 or to the personal device 104. In an example, the process 800 may be performed by the in-vehicle component 106 and the personal device 104 in communication over a wireless connection 114.

At operation 802, the personal device 104 determines whether there is user interaction with the vehicle component interface application 118. In an example, the vehicle component interface application 118 may receive input to a user interface 600 of the personal device 104 to adjust the state of the in-vehicle component 106. If an interaction is received, control passes to operation 804. Otherwise control passes to operation 806.

At operation 804, the personal device 104 updates the control values of the in-vehicle component 106. In an example, the vehicle component interface application 118 may send an updated state of the controls to the in-vehicle component 106 using the EXCHANGEW characteristic of the service. After operation 804, control passes to operation 802.

At operation 806, the in-vehicle component 106 determines whether there is user interaction with the in-vehicle component 106. In an example, a user may adjust a control value of the in-vehicle component 106 using the controls of the in-vehicle component 106. If a control value of the in-vehicle component 106 has changed, control passes to operation 808. Otherwise, control passes to operation 802.

At operation 808, the personal device 104 receives control state values from the in-vehicle component 106. In an example, the vehicle component interface application 118 may acquire the current state of the controls from the in-vehicle component 106 using the EXCHANGER characteristic of the service.

At operation 810, the personal device 104 refreshes the user interface 600. In an example, the vehicle component interface application 118 may indicate the changed state of the controls (e.g., on, off, volume level, etc.) based on the state of the controls received at operation 808. After operation 810, control passes to operation 802.

Computing devices described herein, such as the personal devices 104 and in-vehicle components 106, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a wireless transceiver configured to scan for advertised services; and
    a processor programmed to
        receive a service identifier of a service from the wireless transceiver,
        verify a name included in the service identifier indicates that the service identifier is an in-vehicle component, and
        decode, from the service identifier, a relative location within a vehicle, a zone controlled by the in-vehicle component, and a category of functionality of the in-vehicle component.

2. The system of claim 1, wherein the processor is further programmed to decode, from the service identifier, a protocol identifier indicative of a protocol by which the processor receives a functionality definition of the in-vehicle component.

3. The system of claim 1, wherein the processor is further programmed to add the in-vehicle component to a listing of verified in-vehicle components scanned to be within a vehicle cabin.

4. The system of claim 1, wherein the processor is further programmed to:
    determine that the service identifier was previously detected by the wireless transceiver and includes an updated counter; and
    invoke a user interface for control of the in-vehicle component when the zone controlled by the in-vehicle component and a zone associated with the processor are a match.

5. The system of claim 1, wherein the processor is further programmed to:
    enumerate characteristics of the service of the in-vehicle component describing configurable functions of the in-vehicle component; and
    generate a user interface for control of the in-vehicle component listing the configurable functions based on the characteristics.

6. The system of claim 5, wherein the processor is further programmed to:
    retrieve a control state of the in-vehicle component using a read characteristic of the service;

receive an indication of a user interaction with the user interface for control of the in-vehicle component; and update the control state of the in-vehicle component using a write characteristic of the service.

7. The system of claim 5, wherein the processor is further programmed to:

retrieve a control state of the in-vehicle component using a read characteristic of the service responsive to receipt of an indication of a user interaction with the in-vehicle component; and update the user interface for control of the in-vehicle component listing the configurable functions based on the control state.

8. A computer-implemented method comprising:

enumerating characteristics of a service of an in-vehicle component describing configurable functions of the in-vehicle component;

retrieving a control state of the in-vehicle component using a read characteristic of the service;

generating a user interface of the in-vehicle component indicating the configurable functions and the control state; and updating the control state of the in-vehicle component using a write characteristic of the service responsive to user input to the user interface.

9. The method of claim 8, further comprising:

determining, by a personal device, that a service identifier of the service is previously detected by the personal device and includes an updated counter; and invoking the user interface on the personal device when a zone controlled by the in-vehicle component and a zone associated with the personal device are a match.

10. The method of claim 8, further comprising:

receiving a service identifier of the service;

verifying a name included in the service identifier indicates that the service identifier is an in-vehicle component; and decoding, from the service identifier, at least two of a location of the in-vehicle component, a zone controlled by the in-vehicle component, and a category of functionality of the in-vehicle component.

11. The method of claim 10, further comprising decoding a protocol identifier indicative of a protocol by which the in-vehicle component provides a functionality definition of the in-vehicle component.

12. The method of claim 10, further comprising adding the in-vehicle component to a listing of verified in-vehicle components scanned to be within a vehicle cabin when the name included in the service identifier indicates that the service identifier is an in-vehicle component.

13. The method of claim 10, wherein the read characteristic of the service is associated with a first predefined name common to in-vehicle components, and the write characteristic of the service is associated with a second predefined name common to in-vehicle components.

14. A system comprising:

a wireless transceiver;

a user interface element; and a processor programmed to broadcast, using the wireless transceiver, a service identifier indicating presence of an in-vehicle component as well as functionality of the in-vehicle component; and update a counter value included in the service identifier responsive to identification of an update to a control state of the in-vehicle component determined according to user input to the user interface element.

15. The system of claim 14, wherein the user interface element is a control of a vehicle cabin light, and the control state of the in-vehicle component indicates whether the vehicle cabin light is on or off.

16. The system of claim 14, wherein the user interface element is a control of a vehicle cabin speaker, and the control state of the in-vehicle component indicates a volume level of the vehicle cabin speaker.

17. The system of claim 14, wherein the service identifier indicates a vehicle cabin zone controlled by the in-vehicle component.

18. The system of claim 17, further comprising a personal device programmed to:

determine that the service identifier was previously detected by the wireless transceiver and includes the update to the counter value; and invoke a user interface for control of the in-vehicle component when the zone controlled by the in-vehicle component and a zone associated with the processor are a match.

* * * * *